United States Patent [19]
Hershauer

[11] Patent Number: 6,029,611
[45] Date of Patent: Feb. 29, 2000

[54] ANIMAL TETHERING SYSTEM

[75] Inventor: Michael Hershauer, Gilbert, Ariz.

[73] Assignee: Innovative Products Concepts, Inc., Phoenix, Ariz.

[21] Appl. No.: 09/231,332

[22] Filed: Jan. 13, 1999

Related U.S. Application Data

[60] Provisional application No. 60/071,459, Jan. 14, 1998.

[51] Int. Cl.[7] .................................................. A01K 27/00
[52] U.S. Cl. ............................................................. 119/771
[58] Field of Search ..................................... 119/769, 770, 119/771, 783, 792, 795

[56] References Cited

U.S. PATENT DOCUMENTS

| | | | |
|---|---|---|---|
| 4,638,764 | 1/1987 | Anderson | 119/771 |
| 4,827,876 | 5/1989 | Krekelberg | 119/771 |
| 4,879,972 | 11/1989 | Crowe et al. | 119/769 |
| 5,161,486 | 11/1992 | Brown | 119/770 |
| 5,551,379 | 9/1996 | Hart | 119/771 |
| 5,632,234 | 5/1997 | Parker | 119/769 |
| 5,701,848 | 12/1997 | Tozawa | 119/797 |

*Primary Examiner*—Thomas Price
*Attorney, Agent, or Firm*—Gregory J. Nelson

[57] ABSTRACT

An animal tethering system attachable to a collar or harness worn by the animal to restrain the animal in the cargo area of a vehicle. The system has a short control lead having a loop handle at one end and a fastener at the other. A longer extension leash has fasteners at both ends. When tethered, the control lead is secured by its fastener to one tie down. The extension leash has one end secured to the opposite vehicle tie down and is threaded through the loop of the lead and fastened at its opposite end to the animal's collar or harness. Preferably the attachment location is to a harness in the chest area of the animal. The control lead may be used alone or with the extension leash as a lead when walkling the animal.

7 Claims, 3 Drawing Sheets

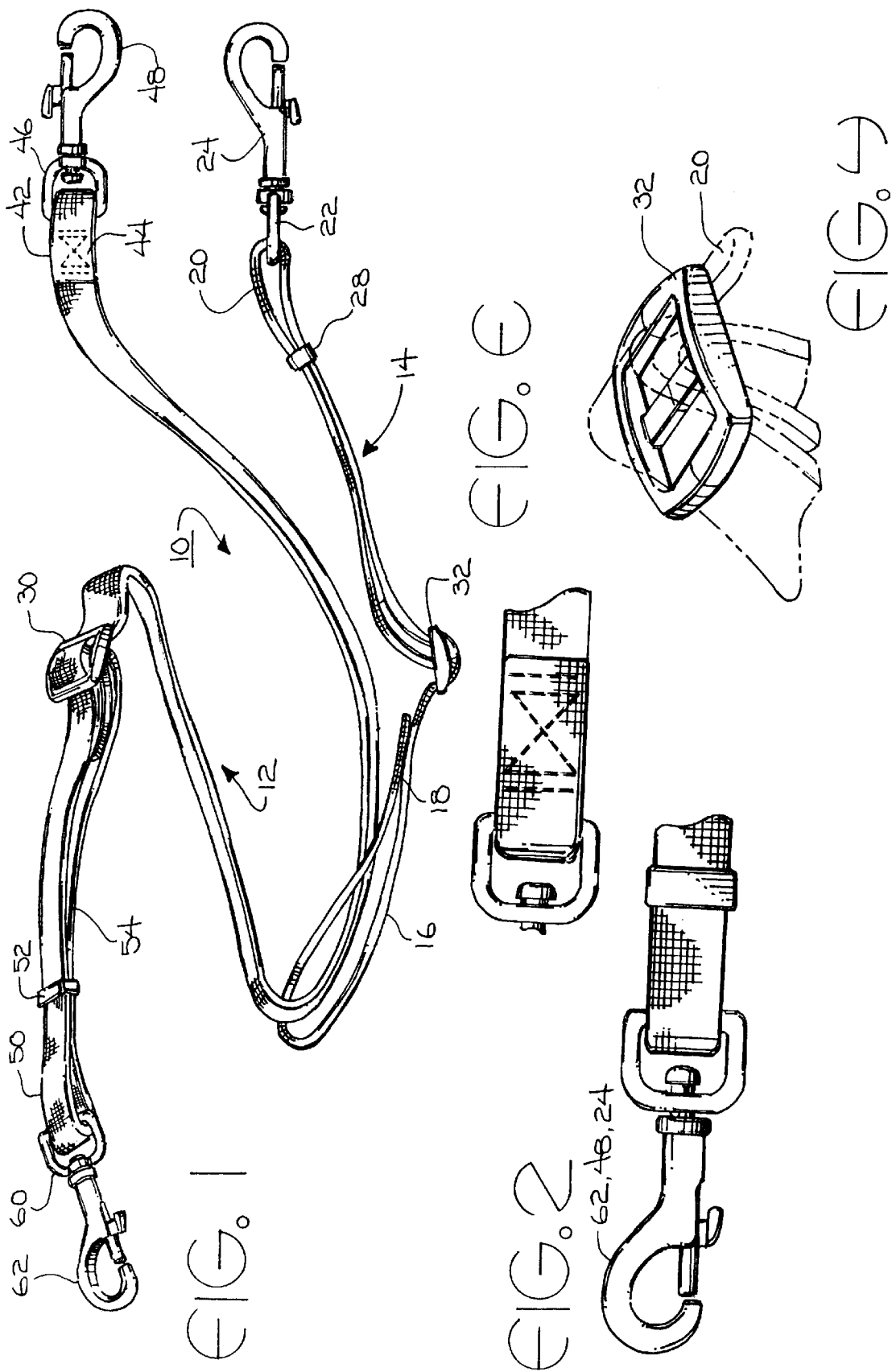

ANIMAL TETHERING SYSTEM

REFERENCE TO RELATED APPLICATION

This application is based on Provisional Patent application Ser. No. 60/071,459, filed Jan. 14, 1998 titled "Animal Tethering System".

FIELD OF THE INVENTION

The present invention relates to an animal tethering system and more particularly relates to a dog restraint system specifically designed for use in connection with utility vehicles, mini-vans and other similar vehicles.

BACKGROUND OF THE INVENTION

It is common for pet owners to transport their dogs in the rear cargo area of utility vehicles, vans and other similar vehicles. Most dogs become excited when transported in this manner and will rambunctiously move about in the back of the vehicle. As a result, the dog can scratch or tear the vehicle interior, cause smudging of the windows and serve as a distraction to the vehicle driver and passengers.

Accordingly, the present invention will serve as a restraint for both small and large dogs tethering them in the rear cargo area of the vehicle preventing the dog from damaging the vehicle and distracting the occupants.

The tethering system of the present invention is designed to allow the animal sufficient freedom of movement to stand, sit and lie without discomfort or injury. The tethering system prevents the animal from scratching the sides of the vehicle as well as from bothering or distracting the occupants, confining the dog in a position at the rear of the vehicle away from the driver.

The tethering system of the present invention has two components, one which can serve as a pet lead which may be attached to the animal to assist in controlling the animal as it is led to and from the vehicle. This allows the pet owner to control the animal, as for example, during travel from the house to the vehicle without the owner or attendant having to remove the lead. The tether provides a safety feature which will prevent the dog from running free when being led to and from the vehicle avoiding possible injury to the dog and inconvenience to the owner. The other component of the tether system is an extension strap which is attachable to the vehicle interior or which may be joined to the lead as an extension.

The system of the present invention can be installed and removed from the vehicle in a matter of seconds and once installed does not interfere with the driver's rear view vision.

While the tethering system of the present invention is designed as a restraint system, it is to be noted that it is not intended to serve as a safety restraint which will prevent injury to the animal in the event of a collision.

THE PRIOR ART

Various animal restraints can be found in the prior art such as the VIP car safety harness which attaches around the dog's chest. The back of the harness has a loop to clip the back seat belt. The product is intended to keep the dog in the back seat, however, it is possible for an animal to release such a device by stepping on the vehicle seat belt release.

Back seat nets, either flexible or rigid in construction, are also available in the prior art. These devices attach to the interior of the vehicle to form a barrier to prevent the dog from accessing the front seat. However, such devices obstruct the rear view of the driver.

BRIEF SUMMARY OF THE INVENTION

Briefly, the present invention provides an animal tethering system having a short control lead and a longer extension leash connectable to tie down points in the vehicle. The short control lead has a loop handle and is suitable for independent use and is adjustable in length. Once in the vehicle, the dog's collar or harness is secured to the longer extension leash. Preferably the system utilizes a harness which has a point of attachment such as a D-ring located in the chest area of the animal. The longer extension leash is threaded through the loop on the handle of the control lead and secured to one tie down. The short control lead is attached to the opposite vehicle tie down providing a tether point in the vehicle cargo area.

BRIEF DESCRIPTION OF THE DRAWINGS

The above and other objects and advantages of the invention will become more apparent from the following drawings in which:

FIG. 1 is a perspective view of the tethering system of the present invention;

FIG. 2 is a detail view representative of the ends of the leash and lead which each carry a snap ring at opposite ends;

FIG. 3 is a detail view of the attachment of the snap rings to the tethering system;

FIG. 4 is a detail view showing adjustment buckles which are provided on both the control lead and the extension leash;

DETAILED DESCRIPTION OF THE INVENTION

Figure 5:
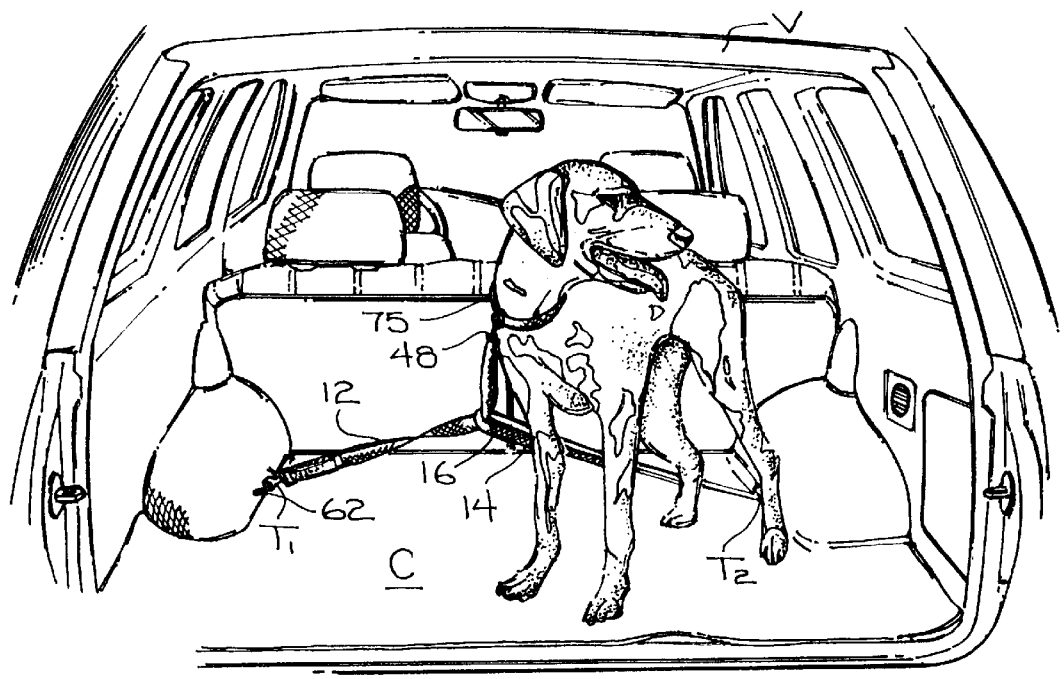
FIG. 5 is a view from the rear of a representative vehicle such as a utility vehicle showing a dog tethered in place.

Turning to the drawings, particularly FIGS. 1 to 7, the tethering system is generally designated by the numeral 10 and includes a control lead 14 and an extension leash 12. Both the control lead and extension leash may be fabricated from any suitable material such as nylon webbing or leather and may be suitably reinforced for durability. The control lead 14 consists of a strap having a loop 16 at one end which is formed by the distal end of the strap which is stitched or otherwise attached at 18 to form the loop. The opposite end of the control lead is reversely formed into a loop 20 to which is attached a D-ring 22. The D-ring 22 pivotally supports a detachable fastener shown as a snap ring 24 but may be a spring type clip. Loop 20 is doubled over a portion of the lead through slide 28. The control lead 14 and the overlying portion 32 of loop 20 are threaded through buckle 32 as best seen in FIG. 4. This construction allows the overall length of the control lead to be adjusted in accordance with the width of the vehicle to which the dog is to be tethered.

The other component of the system is the extension leash 12 which has a strap-like body with a loop 42 at one end which is formed by stitching a portion of the end of the strap to the body of the strap at 44. A D-ring 46 is secured to the loop and pivotally supports a detachable fastener such as snap ring 48. The opposite end of the extension leash 12 is formed into a loop 54 by doubling over a portion of the end of the strap and extending it through slidable clip 52. The doubled over portion 54 and a portion of the strap body extend through a buckle 30A which is the same type as buckle 32 shown in FIG. 4. A D-ring 60 and a closable snap ring 62 are secured at loop 50. FIG. 2 is a detail view representative of the attachment of snap rings 24, 48 and 62.

Referring to FIG. 5, a vehicle "V" has a rear cargo area "C" which conventionally has tie-downs "T1" and "T2" at opposite sides of the cargo area. If these tie downs are not present in the vehicle, they may be provided as an accessory and adhesively attached or attached by fasteners such as sheet metal screws.

Figure 7:
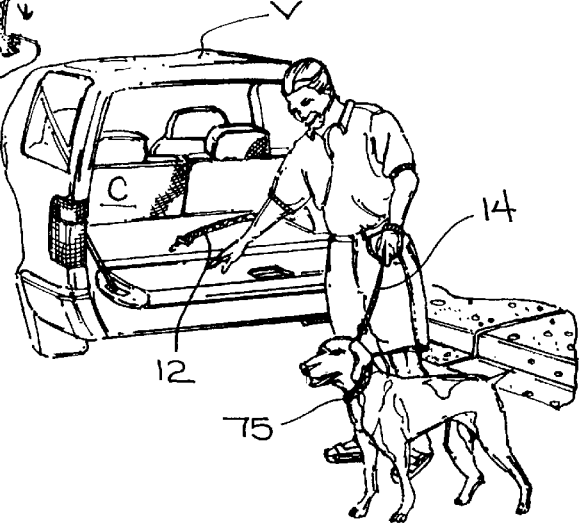
FIG. 7 shows the use of the lead strap separately as a lead while leading the dog to and from the vehicle prior to attaching the harness system in place.

In use, as seen in FIG. 7, the control lead 14 is attached to the existing collar 75 of the animal at snap fastener 48. The leash 12 is secured to the vehicle interior by securing snap ring 62 to the tie-down T1. The animal can then be led to the vehicle using the control lead 14 and guided into the cargo area "C". Once the animal is in the cargo area, the free end of the extension leash 12 is extended through the loop 16 at one end of the control lead 14 and its end secured to the collar 75. The control lead is removed from the animal and secured to tie down T2 at fasteners 24. The dog is then in the tethered position as shown in FIG. 5 which allows the animal limited freedom of movement within the rear of the vehicle. The length of the extension leash and control lead can be selectively adjusted at the buckles 30 and 32 in accordance with the physical dimensions of the cargo area and the amount of freedom to be provided the animal.

Figure 6:
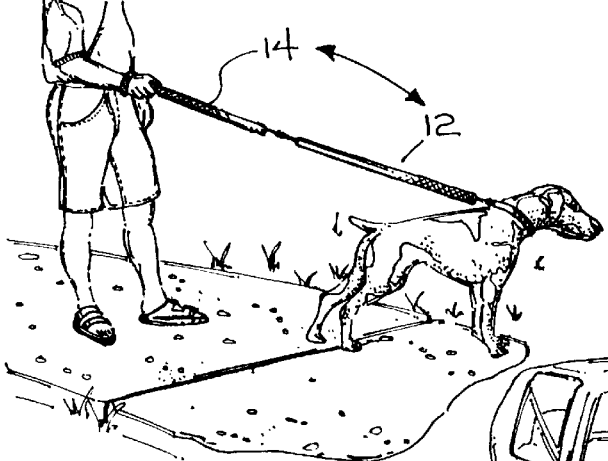
FIG. 6 illustrates use of the tethering system components assembled as a conventional lead to be used when walking a dog.

In FIG. 6, the extension leash 12 and control lead 14 are shown connected together to provide a long lead for walking or exercising a dog. If a shorter lead is required, the extension leash 12 can be removed and the D-ring 24 of the control lead can be secured directly to the dog's collar or to a choke chain or other training device.

Figure 8:
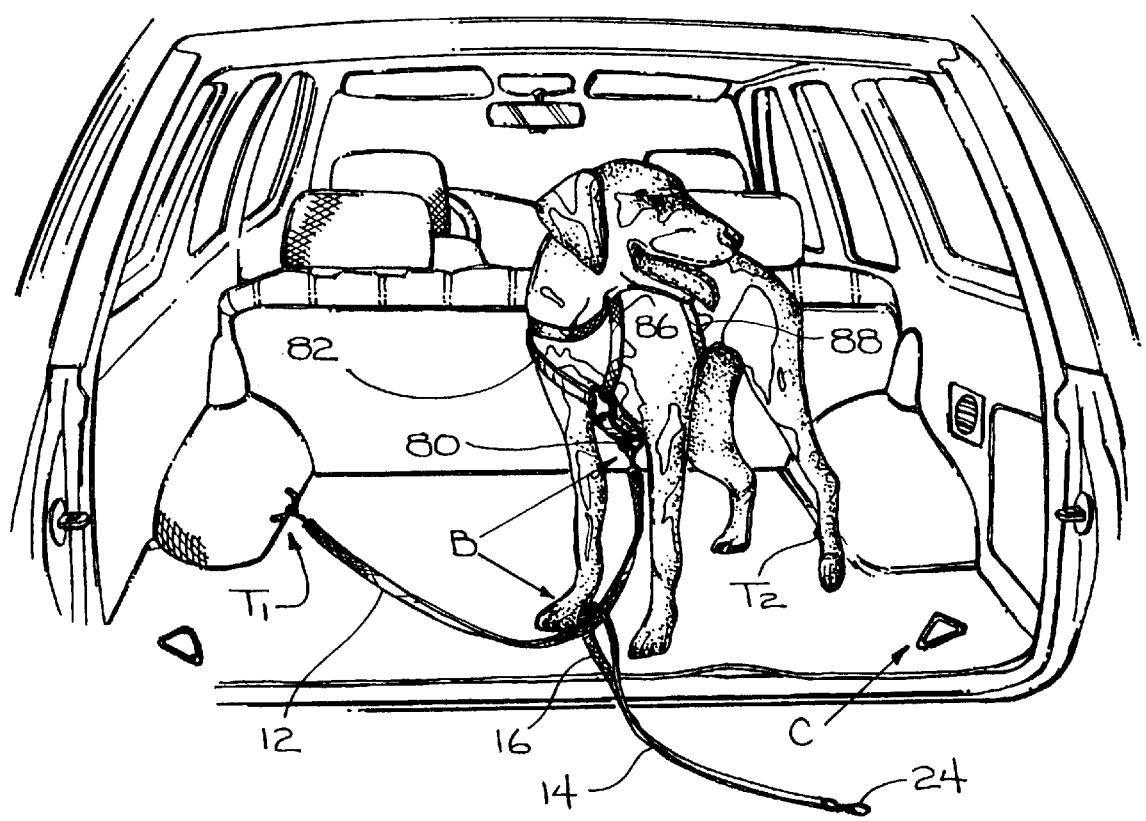
FIG. 8 shows the use of the tethering system used in connection with a conventional animal harness.

In FIG. 8, the animal is shown in a tethered position in the cargo area "C" of a vehicle "V". The extension leash is attached at one end to tie down T1 and at the opposite end to a D-ring 80 located in the chest area of harness 82 with section 86 and 88 which extend around the midsection and chest area of the animal, respectively. The loop 16 of short lead 14 receives the leash 12 and the opposite end is secured to die-down T2 at fasteners 24. The advantage of this arrangement is that the attachment point to the animal is centrally located in the animal's chest area rather than around the neck, reducing possible discomfort as well as lessening the opportunity for the animal to become entangled.

Accordingly, the present invention provides a dog tethering and restraint system for vehicles which is low in cost and the components of which may serve as an extended or a short leash. With the present system, the dog is always on the restraint system and the dog is confined to the rear of the vehicle maintaining the dog away from occupants and passengers. The system will minimize scratching and smudging of vehicle interiors and windows. The system of the present invention can be installed and removed in a matter of seconds and works with conventional collars and harnesses. The system is easily storable when not in use and is fully adjustable to fit a wide range of sport utility, van and other types of vehicles.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. An animal tethering system for securing an animal in a vehicle area having first and second tie downs oppositely positioned in said vehicle area, said system comprising:

(a) a flexible control lead having a loop at one end and a fastener at the other, said fastener being securable at said first vehicle tie down; and (b) a separate extension leash having fasteners at its opposite ends and being sized to pass entirely through said loop and having a first use position with one end of said extension leash attached to said second vehicle tie down and said other end is securable to the animal at an attachment device worn by the animal and having a second use position in which one end of said extension leash is connectable to the said fastener of said control lead to form a long lead.

2. The animal tethering system of claim 1 wherein said lead and leash are adjustable in length.

3. The animal tethering system of claim 1 wherein said lead and leash are fabricated from a mesh-like material.

4. The animal tethering system of claim 1 wherein said fasteners are a snap hook.

5. The animal tethering system of claim 1 wherein the attachment device is a collar.

6. The animal tethering system of claim 1 wherein the attachment device is a harness.

7. The animal tethering system of claim 6 wherein said harness extends around the animal's chest area and further including a fastener located in the chest area.

* * * * *